(12) United States Patent
Nakada

(10) Patent No.: US 8,755,328 B2
(45) Date of Patent: Jun. 17, 2014

(54) RELAY DEVICE, RELAY SYSTEM, RELAY METHOD, RADIO COMMUNICATION SYSTEM, AND PROGRAM

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 13/518,275

(22) PCT Filed: Nov. 17, 2010

(86) PCT No.: PCT/JP2010/070440
§ 371 (c)(1),
(2), (4) Date: Jun. 21, 2012

(87) PCT Pub. No.: WO2011/077862
PCT Pub. Date: Jun. 30, 2011

(65) Prior Publication Data
US 2012/0257532 A1 Oct. 11, 2012

(30) Foreign Application Priority Data

Dec. 24, 2009 (JP) ................................. 2009-292521

(51) Int. Cl.
*H04B 7/204* (2006.01)
(52) U.S. Cl.
USPC .......................................... 370/319; 370/344
(58) Field of Classification Search
USPC ......... 370/279, 281, 285, 293, 295, 319, 344, 370/235
See application file for complete search history.

(56) References Cited

U.S. PATENT DOCUMENTS

| 7,233,771 | B2 | 6/2007 | Proctor, Jr. et al. |
| 7,944,871 | B2* | 5/2011 | Imamura et al. ............... 370/315 |
| 8,023,885 | B2 | 9/2011 | Proctor, Jr. et al. |
| 8,060,009 | B2 | 11/2011 | Gainey et al. |
| 8,072,932 | B2 | 12/2011 | Sun et al. |
| 2009/0047898 | A1* | 2/2009 | Imamura et al. ................... 455/7 |

FOREIGN PATENT DOCUMENTS

| JP | 10-70498 A | 3/1998 |
| JP | 2002-111571 A | 4/2002 |
| JP | 2006-503481 A | 1/2006 |
| JP | 2007-251789 A | 9/2007 |
| JP | 2008-503907 A | 2/2008 |
| JP | 2008-236370 A | 10/2008 |
| JP | 2009-524303 A | 6/2009 |
| JP | 2009-246508 A | 10/2009 |

\* cited by examiner

*Primary Examiner* — Brenda H Pham
(74) *Attorney, Agent, or Firm* — Foley & Lardner LLP

(57) ABSTRACT

A relay device according to the present invention includes an uplink signal relaying unit that performs an uplink signal relaying operation that amplifies an uplink signal transmitted through an uplink channel from a mobile station and re-transmits the amplified uplink signal to a base station; a frequency information acquisition unit that acquires frequency information that represents a frequency band that said mobile station uses for the uplink channel periodically or at predetermined timings; an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit.

15 Claims, 11 Drawing Sheets

RELAY DEVICE, RELAY SYSTEM, RELAY METHOD, RADIO COMMUNICATION SYSTEM, AND PROGRAM

This application is the National Phase of PCT/JP2010/070440, filed Nov. 17, 2010, which claims priority to Japanese Application No. 2009-292521, filed Dec. 24, 2009, the disclosures of which are hereby incorporated by reference in their entirety.

TECHNICAL FIELD

The present invention relates to a Relay device, a relay system, a relay method, a radio communication system, and a program.

BACKGROUND ART

Recently, to improve users' convenience and satisfaction, communication providers have given high priority to the reduction of blind areas such as shadow of buildings in downtown, the insides of restaurants, cell edges, and high-rise buildings where radio waves of mobile stations such as mobile phones can not sufficiently reach.

In an area that does not have an enough space for the facility of a base station or a mountain area where the number of users is small, repeaters (relay devices) that perform a relaying operation that amplifies signals transmitted from base stations and mobile stations and re-transmits the amplified signals are often installed instead of new base stations.

However, since relay devices also amplify not only signals received from base stations and mobile stations, but also interference waves and noises received together with those signals and relay the resultant signals, the relay devices may lead to an adverse affect upon the system such that they deteriorate signals received by base stations and neighbor mobile stations.

Thus, it is desirable that while mobile stations in the neighborhood of a relay device are not communicating with a base station, the relay device needs to restrict the relaying operation whenever possible.

To do that, recent relay devices are controlled such that they perform the relaying operation only if the total reception power of all uplink signals exceeds a reference power level that has been set for them.

Radio communication systems that have been implemented or evaluated (hereinafter it is assumed that they includes mobile phone systems or the like) use a transmission scheme in which a wide system frequency band is ensured and segmented for individual mobile stations when necessary.

For example, in LTE (Long Term Evolution) that is being standardized in 3GPP (Third Generation Partnership Project), a frequency band that is as wide as a maximum of 20 MHz is segmented into 100 resource blocks and also chronologically segmented into short periods. The resource blocks are assigned to control channels and data channels.

Thus, in a high traffic area, the entire system frequency band is always used. In contrast, in a low traffic area, part of the system frequency band is used for a short period.

Consequently, under the LTE's system environment, when the relay device controls the relaying operation based on the total reception power of all uplink signals, namely the total reception power of the entire system frequency band, if the number of mobile stations in the neighborhood of the relay device is very small, even if a mobile station transmits an uplink signal, since the total reception power of the uplink signal that the relay device receives does not exceed the reference power level, the relay device may thus not correctly perform the relaying operation.

To solve such a problem, it can be contemplated that a relay device extracts an uplink signal in a frequency band that a mobile station uses for an uplink channel and performs the relaying operation based on only the reception power of the extracted uplink signal according to a narrow band signal extracting technique presented in Patent Literature 1.

RELATED ART LITERATURE

Patent Literature

Patent Literature 1: JP2008-503907, Publication (translated version)

SUMMARY OF THE INVENTION

Problem to be Solved by the Invention

However, Patent Literature 1 does not disclose any specific method that serves to extract a narrow band signal. In addition, according to the technique presented in Patent Literature 1, it is supposed that a signal in a predetermined frequency hand is extracted as a narrow band signal.

However, a frequency band that mobile stations use for uplink channels may be changed by their communication provider during its operation.

In such a situation, even if a relay device uses the technique that is presented in Patent Literature 1 and that extracts a signal of a predetermined frequency band, since the relay device cannot follow a changed frequency band for uplink channels, it cannot correctly perform the relaying operation for uplink signals.

Therefore, an object of the present invention is to solve the foregoing problem and provide a relay device, a relay system, a relay method, a radio communication system, and a program that can perform the uplink signal relaying operation corresponding to a changed frequency band that mobile stations use for uplink channels.

Means that Solve the Problem

A relay device according to the present invention comprises:

an uplink signal relaying unit that performs an uplink signal relaying operation that amplifies an uplink signal transmitted through an uplink channel from a mobile station and re-transmits the amplified uplink signal to a base station;

a frequency information acquisition unit that acquires frequency information that represents a frequency band that said mobile station uses for the uplink channel periodically or at predetermined timings;

an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit.

A relay system according to the present invention comprises:

an uplink signal relaying unit that performs an uplink signal relaying operation that amplifies an uplink signal transmitted through an uplink channel from a mobile station and re-transmits the amplified uplink signal to a base station;

a frequency information acquisition unit that acquires frequency information that represents a frequency band that said mobile station uses for the uplink channel periodically or at predetermined timings;

an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit.

A relay method according to the present invention comprises:

performing an uplink signal relaying operation that amplifies an uplink signal transmitted through an uplink channel from a mobile station and re-transmits the amplified uplink signal to a base station;

acquiring frequency information that represents a frequency band that said mobile station uses for the uplink channel periodically or at predetermined timings;

determining whether or not the average reception power of the uplink signal in the frequency band represented by said acquired frequency information exceeds a predetermined threshold; and controlling said uplink signal relaying operation based on said determined result.

A radio communication system according to the present invention comprises:

a mobile station; a base station; and a relay device,
wherein said relay device, includes:
an uplink signal relaying unit that performs an uplink signal relaying operation that amplifies an uplink signal transmitted through an uplink channel from said mobile station and re-transmits the amplified uplink signal to said base station;

a frequency information acquisition unit that acquires frequency information that represents a frequency band that said mobile station uses for the uplink channel periodically or at predetermined timings;

an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit.

A program according to the present invention causes a relay device to execute procedures comprising:

performing an uplink signal relaying operation that amplifies an uplink signal transmitted through an uplink channel from a mobile station and re-transmits the amplified uplink signal to a base station;

acquiring frequency information that represents a frequency band that said mobile station uses for the uplink channel periodically or at predetermined timings;

determining whether or not the average reception power of the uplink signal in the frequency band represented by said acquired frequency information exceeds a predetermined threshold; and controlling said uplink signal relaying operation based on said determined result.

Effect of the Invention

According to the present invention, a relay device acquires frequency information that represents a frequency band that mobile stations use for uplink channels periodically or at predetermined timings and controls the relaying operation for uplink signals based on the uplink signals in the frequency band that the acquired frequency information represents.

Thus, even if a frequency band that is used for uplink channels is changed, since the relay device can reflect the changed frequency band to its relaying operation, it can control the uplink signal relaying operation corresponding to the changed frequency band.

BEST MODES THAT CARRY OUT THE INVENTION

Next, with reference to the accompanying drawings, an embodiment of the present invention will be described.

Figure 1:
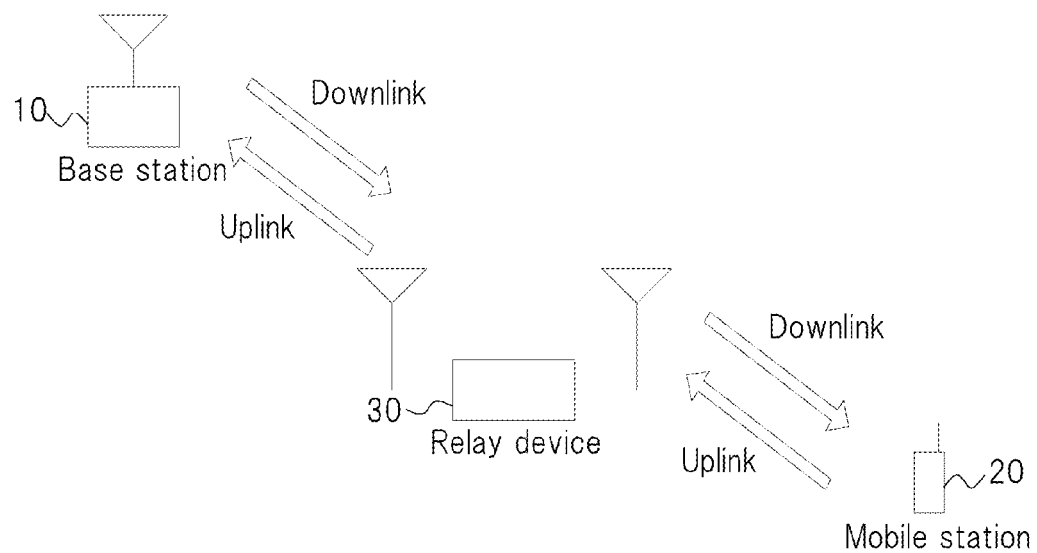
[FIG. 1] is a schematic diagram showing an outlined structure of a radio communication system according to an embodiment of the present invention.

FIG. 1 shows an outlined structure of a radio communication system according to an embodiment of the present invention.

Referring to FIG. 1, the radio communication system according to this embodiment has base station 10, mobile station 20, and relay device 30 that amplifies a downlink signal and an uplink signal transmitted from base station 10 and mobile station 20 and re-transmits them.

Although FIG. 1 shows one base stations 10, one mobile stations 20, and one relay devices 30, their numbers are not limited to one, but may be plural.

It is assumed that an uplink transmission scheme (OFDMA (Orthogonal Frequency Division Multiple Access), SC-FDMA (Single-Carrier Frequency Division Multiple Access), or the like) in which a wide system frequency band is segmented and assigned to mobile station 20 is used.

Figure 2:
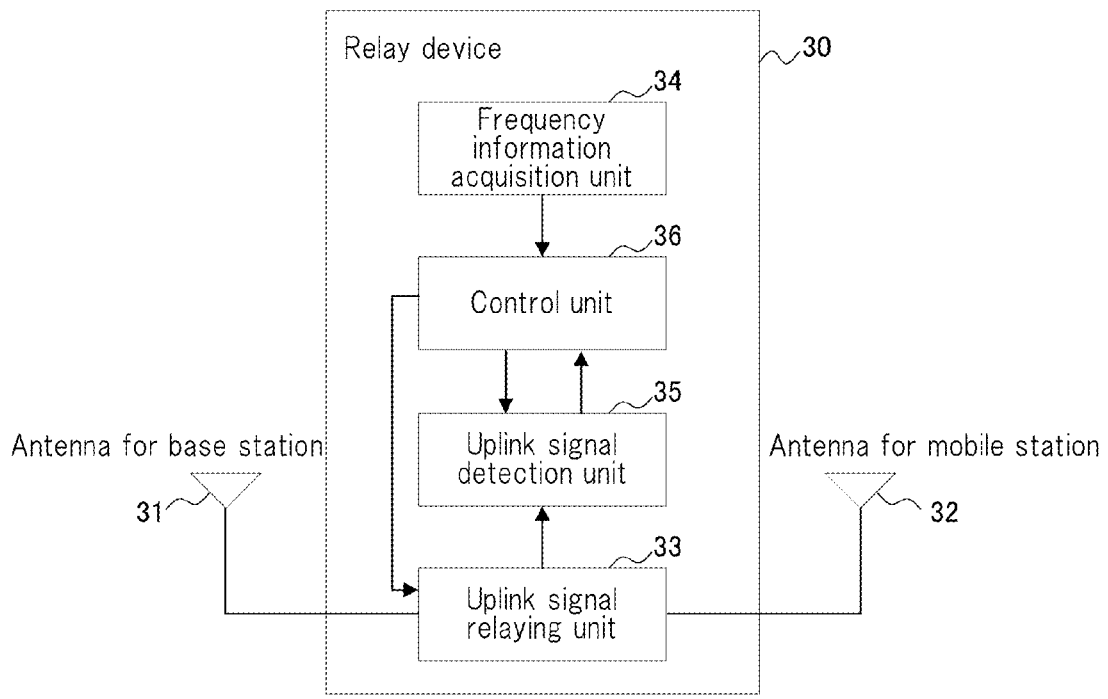
[FIG. 2] is a block diagram showing a structure of a relay device according to the embodiment of the present invention.

FIG. 2 shows a structure of relay device 30 according to this embodiment. FIG. 2 shows only constituent elements with respect to an uplink signal relaying operation that is a characteristic portion of the present invention.

Referring to FIG. 2, relay device 30 according to this embodiment has antenna for base station 31, antenna for mobile station 32, uplink signal relaying unit 33, frequency information acquisition unit 34, uplink signal detection unit 35, and control unit 36.

Uplink signal relaying unit 33 performs an uplink signal relaying operation that amplifies an uplink signal transmitted from base station 10 and received by antenna for mobile station 32 and re-transmits the amplified uplink signal to mobile station 20 through the antenna for base station 31.

Frequency information acquisition unit 34 acquires frequency information that represents a frequency band that base station 10 uses for an uplink channel periodically or at particular timings.

Although frequency information may be acquired according to the following methods, details will be described later.
(1) Frequency information is periodically acquired from system information transmitted from base station 10.
(2) Frequency information is acquired from setup information concerning which a monitor control device (not shown) notifies relay device 30 periodically or at predetermined timings.

Uplink signal detection unit 35 determines whether or not the average reception power of the uplink signal in the frequency band represented by the frequency information acquired by frequency information acquisition unit 34 exceeds a predetermined threshold.

Control unit 36 controls the uplink signal relaying operation that uplink signal relaying unit 33 performs based on the determined result of uplink signal detection unit 35. As a control method for the uplink signal relaying operation, if the average reception power exceeds the predetermined threshold, the uplink signal relaying operation may be turned on.

As described above, according to this embodiment, relay device 30 acquires frequency information that represents the frequency band that mobile station 20 uses for the uplink channel periodically or at predetermined timings and controls the uplink signal relaying operation based on the uplink signal in the frequency band.

Thus, even if the frequency band of the uplink channel is changed, since relay device 30 can reflect the changed frequency band to the uplink signal relaying operation, relay device 30 can perform the uplink signal relaying operation corresponding to the changed frequency band of the uplink channel.

WORKING EXAMPLES

Next, working examples of the embodiment of the present invention will be described.

Working Example 1

Figure 3:
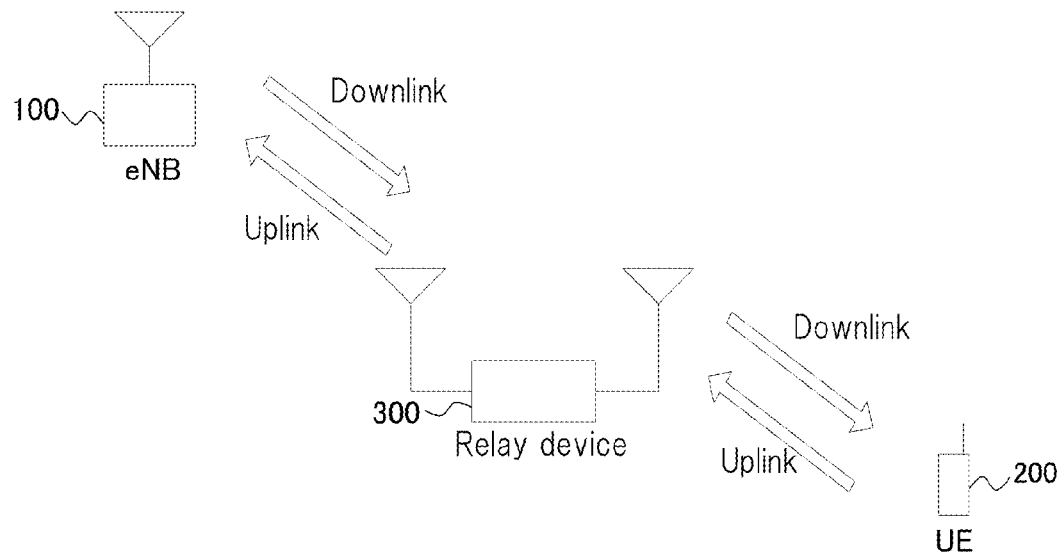
[FIG. 3] is a schematic diagram showing an outlined structure of a radio communication system according to working examples 1 and 2 of the present invention.

FIG. 3 shows an outlined structure of a radio communication system according to working example 1 of the present invention.

Referring to FIG. 3, the radio communication system according to this working example has eNB (evolved Node B) 100, UE (User Equipment) 200, and relay device 300.

In FIG. 3, eNB 100 is an example of base station 10 shown in FIG. 1; UE 200 is an example of mobile station 20 shown in FIG. 1; and relay device 300 is an example of relay device 30 shown in FIG. 1.

Although FIG. 3 shows one eNB 100, one UE 200, and one relay device 300, their numbers are not specified to one, but may be plural.

The radio communication system according to this working example is applied to for example an FDD-LTE (Frequency Division Duplex-Long Term Evolution) scheme based mobile telephone system defined in 3GPP (Third Generation Partnership Project/[URL] http://www.3gpp.org).

Thus, the transmission scheme for a downlink from eNB 100 to UE 200 is OFDMA, whereas the transmission scheme for an uplink from UE 200 to eNB 100 is SC-FDMA.

It is assumed that relay device 300 is located at a position where relay device 300 can receive physical downlink channel signals such as PBCH (Physical Broadcast Channel), PDSCH (Physical Downlink Shared Channel), and PDCCH (Physical Downlink Control Channel), and physical downlink signals such as P-SS (Primary Synchronization Signal), S-SS (Secondary Synchronization Signal), and RS (Reference Signal) with a predetermined signal power level.

In contrast, it is assumed that since UE 200 is not located at a position where UE 200 can directly receive such physical downlink channel signals and physical signals from eNB 100, UE 200 receives signals that have been amplified and re-transmitted by relay device 300.

Likewise, it is assumed that eNB 100 receives signals that have been amplified and re-transmitted as physical uplink channel signals such as PRACH (Physical Random Access Channel), PUSCH (Physical Uplink Shared Channel), PUCCH (Physical Uplink Control Channel) and physical uplink signals such as RS (Reference Signal).

Figure 4:
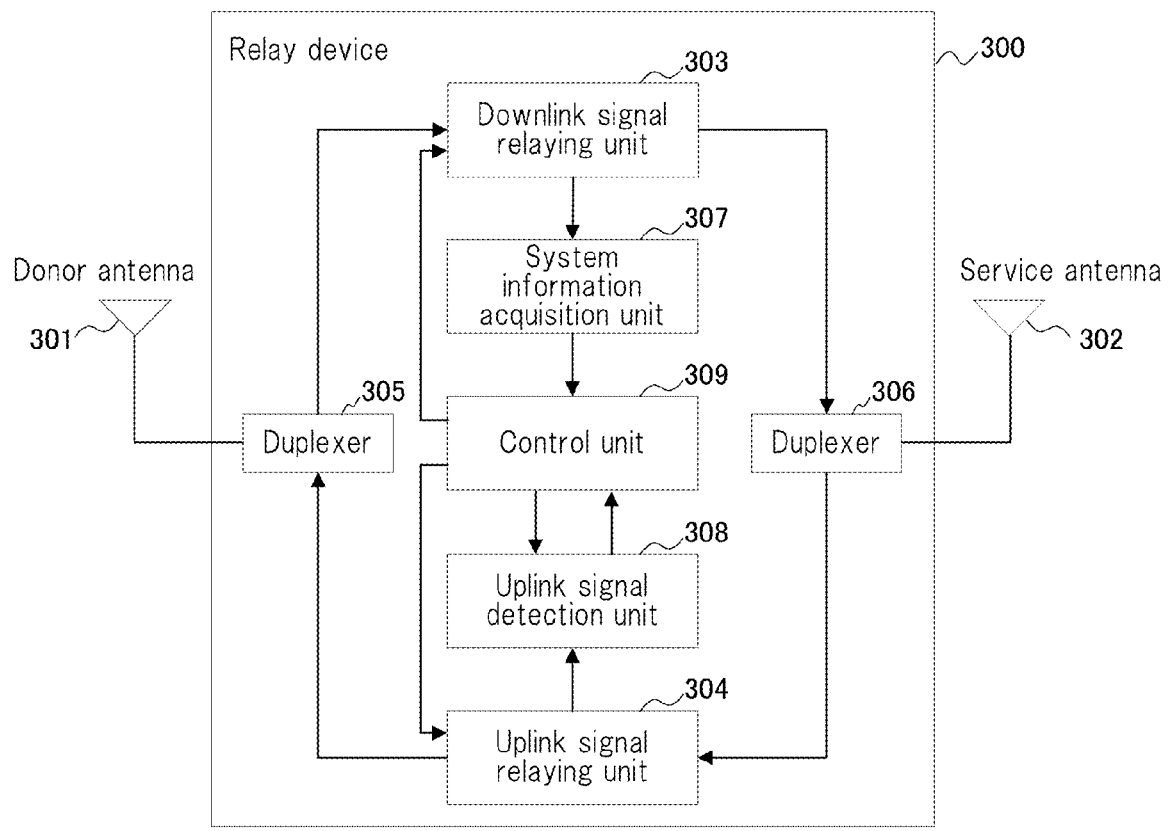
[FIG. 4] is a block diagram showing a structure of a relay device according to working examples 1 and 2 of the present invention.

FIG. 4 shows a structure of relay device 300 according to this working example.

Referring to FIG. 4, relay device 300 according to this working example has donor antenna 301, service antenna 302, downlink signal relaying unit 303, uplink signal relaying unit 304, duplexers 305 and 306, system information acquisition unit 307, uplink signal detection unit 308, and control unit 309.

In FIG. 4, donor antenna 301 is an example of antenna for base station 31 shown in FIG. 2; service antenna 302 is an example of antenna for mobile station 32 shown in FIG. 2; uplink signal relaying unit 304 is an example of uplink signal relaying unit 33 shown in FIG. 2; system information acquisition unit 307 is an example of frequency information acquisition unit 34 shown in FIG. 2; uplink signal detection unit 308 is an example of uplink signal detection unit 35 shown in FIG. 2; and control unit 309 is an example of control unit 36 shown in FIG. 2.

A downlink signal transmitted from eNB 100 is received by donor antenna 301 and output to downlink signal relaying unit 303 through duplexer 305.

Downlink signal relaying unit 303 performs a downlink signal relaying operation that amplifies the downlink signal received by donor antenna 301 and re-transmits the amplified downlink signal to UE 200 through service antenna 302.

Specifically, downlink signal relaying unit 303 filters the downlink signal received by donor antenna 301 depending on whether or not the downlink signal is included in the frequency band needed for the relaying operation, causes an amplifier to amplify the filtered downlink signal, and then outputs the amplified downlink signal. The downlink signal that is output from downlink signal relaying unit 303 is output to service antenna 302 through duplexer 306 and then re-transmitted through service antenna 302 to UE 200 in the neighborhood of relay device 300. At this point, the frequency band for downlink signals that downlink signal relaying unit 303 relays, the gain of the amplifier, and ON/OFF operations of the downlink signal relaying operation are set by control unit 309.

On the other hand, an uplink signal transmitted from UE 200 is received by service antenna 302 and then output to uplink signal relaying unit 304 through duplexer 306.

Uplink signal relaying unit 304 performs an uplink signal relaying operation that amplifies the uplink signal received by service antenna 302 and re-transmits the amplified uplink signal to eNB 100 through donor antenna 301.

Specifically, uplink signal relaying unit 304 filters the uplink signal received by service antenna 302 depending on whether or not uplink signal is included in the frequency band needed for the relaying operation, causes an amplifier to amplify the filtered uplink signal, and then outputs the amplified uplink signal. The uplink signal that is output from uplink signal relaying unit 304 is output to donor antenna 301 through duplexer 305 and re-transmitted to eNB 100 through donor antenna 301. At this point, the frequency band for uplink signals that uplink signal relaying unit 304 relays, the gain of the amplifier, and the ON/OFF operations of the uplink signal relaying operation are set by control unit 309.

As a characteristic operation of the present invention, downlink signal relaying unit 303 inputs a downlink signal to system information acquisition unit 307.

When the downlink signal that is input from downlink signal relaying unit 303 is an RF (Radio Frequency) signal or an IF (Inter frequency) signal, system information acquisition unit 307 transforms the downlink signal into base band digital signals having I phase and Q phase according to an orthogonal demodulation technique. Thereafter, system information acquisition unit 307 performs a process for the downlink base band signals according to an FFT (Fast Fourier Transform) or IDFT (Inverse Discrete Fourier Transform) technique and, using an equalizer as an LTE based UE, performs, acquires system information from PBCH and PDSCH, and notifies control unit 309 of the acquired system information. The system information contains information for PRACH that is a random access channel that UE 200 initially uses when it originates a call. This information also contains frequency information that represents a frequency band that PRACH uses (for example, prach-FrequencyOffset).

As a further characteristic operation of the present invention, uplink signal relaying unit 304 inputs an uplink signal to uplink signal detection unit 308.

Figure 5:
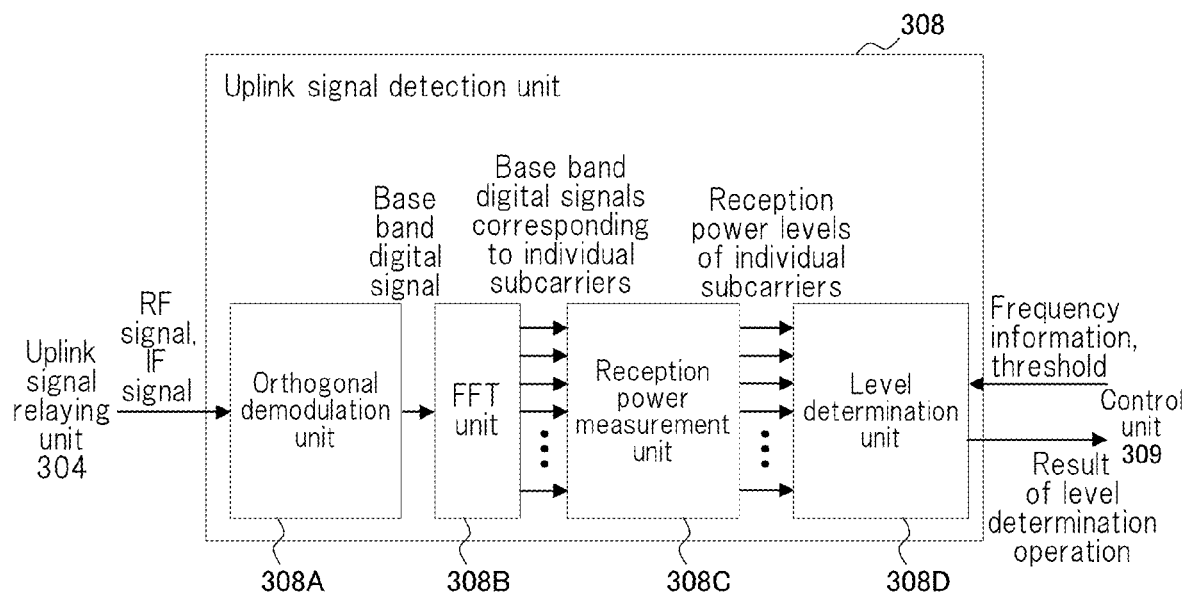
[FIG. 5] is a block diagram showing a structure of an uplink detection unit located in a relay device according to working examples 1, 2, and 3 of the present invention.

FIG. 5 shows a structure of uplink signal detection unit 308.

Referring to FIG. 5, uplink signal detection unit 308 has orthogonal demodulation unit 308A, FFT unit 308B, reception power measurement unit 308C, and level determination unit 308D.

When an uplink signal that is input from uplink signal relaying unit 304 is an RF signal or an IF signal, orthogonal demodulation unit 308A located in uplink signal detection unit 308 transforms the uplink signal into base band digital signals having I and Q phases according to the orthogonal demodulation technique. Thereafter, FFT unit 308B performs an FFT process for the base band digital signals having I and Q phases so as to transform the signals into base band digital signals corresponding to individual subcarriers. Reception power measurement unit 308C measures the average reception power of base band digital signals corresponding to the individual subcarriers. Thereafter, level determination unit 308D acquires frequency information for PRACH contained in the system information from control unit 309. In addition, level determination unit 308D acquires predetermined threshold A that has been set for control unit 309 and determines whether or not the average reception power of a subcarrier corresponding to the frequency band that PRACH uses exceeds threshold A (hereinafter, this operation is referred to as the level determination operation). If the average reception power of PRACH exceeds threshold A, level determination unit 308D notifies control unit 309 about that.

When control unit 309 is notified by uplink signal detection unit 308 that the average reception power of PRACH exceeds threshold A, control unit 309 causes uplink signal relaying unit 304 to turn on the uplink signal relaying operation.

After the uplink signal relaying operation is turned ON, level determination unit 308D continues the level determination operation for the average reception power of PRACH. In this case, the level determination operation is performed based on threshold B (B≤A). Like threshold A, threshold B has been set for control unit 309 and thereby acquired therefrom.

If the average reception power of PRACH becomes equal to or lower than threshold B or thereafter if the average reception power of PRACH exceeds threshold B again, level determination unit 308D notifies control unit 309 about that.

When control unit 309 is notified by uplink signal detection unit 308 that the average reception power of PRACH becomes equal to or lower than threshold B, after a predetermined period elapses, if control unit 309 is not notified by uplink signal detection unit 308 that the average reception power of PRACH exceeds threshold B again, control unit 309 causes uplink signal relaying unit 304 to turn off the uplink signal relaying operation.

Next, with reference to FIG. 6, FIG. 7, and FIG. 8, the operation of the radio communication system according to this working example will be described.

Figure 6:
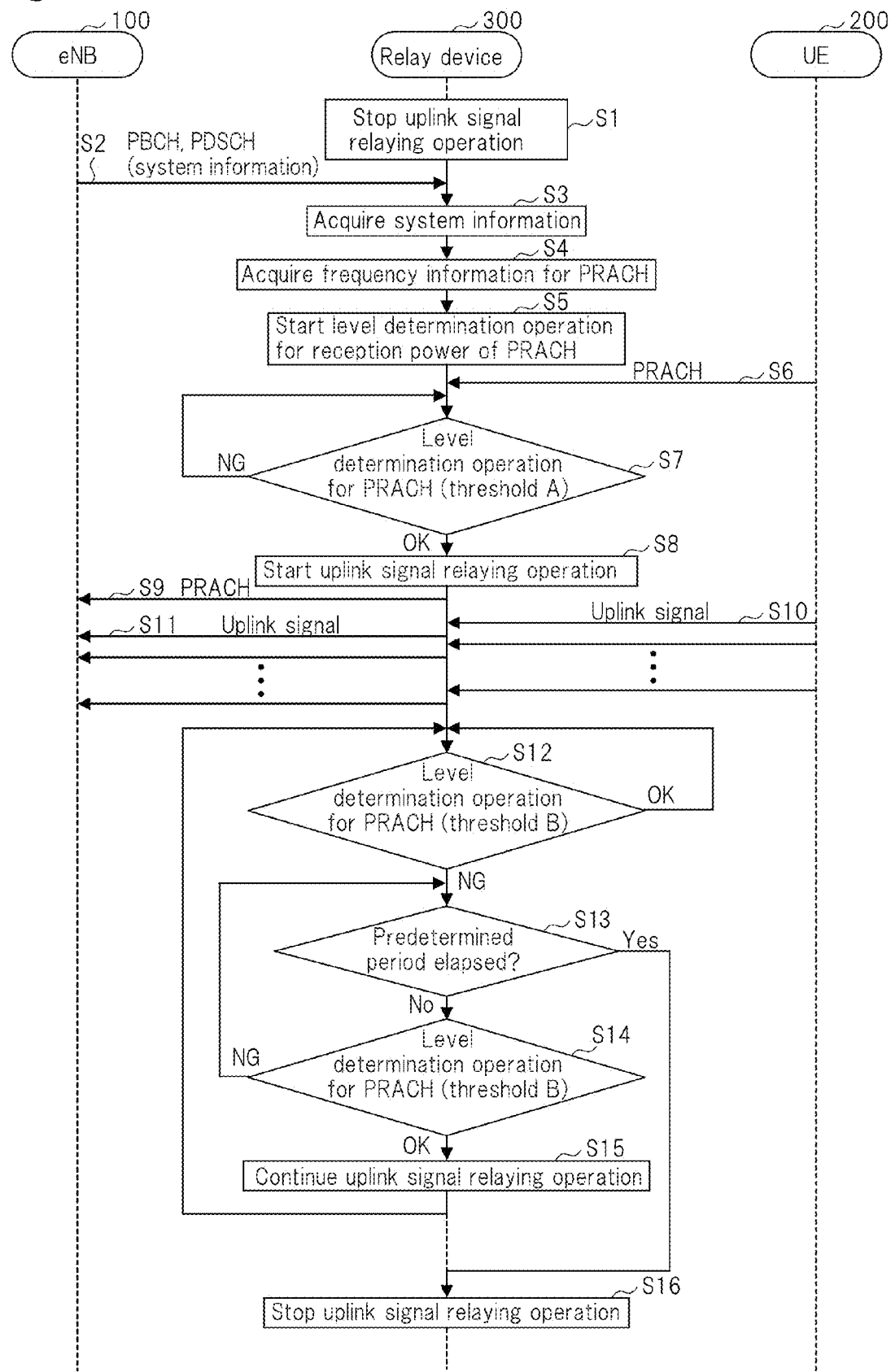
[FIG. 6] is a flow chart describing an operation of the radio communication system according to working example 1 of the present invention.

Referring to FIG. 6, while relay device 300 is stopping the uplink signal relaying operation (at step S1), relay device 300 acquires service information from a downlink signal transmitted through PBCH and PDSCH from eNB 100 (at steps S2 and S3). In addition, relay device 300 acquires frequency information that represents a frequency band that PRACH uses (at step S4).

Thereafter, relay device 300 starts the level determination operation for the average reception power of the frequency band that PRACH uses (at step S5).

First, relay device 300 determines whether or not the average reception power of the uplink signal in the frequency band that PRACH uses from among uplink signals received from UE 200 exceeds threshold A (at steps S6 and S7). The average reception power is measured periodically in a sufficiently short period.

Figure 7:
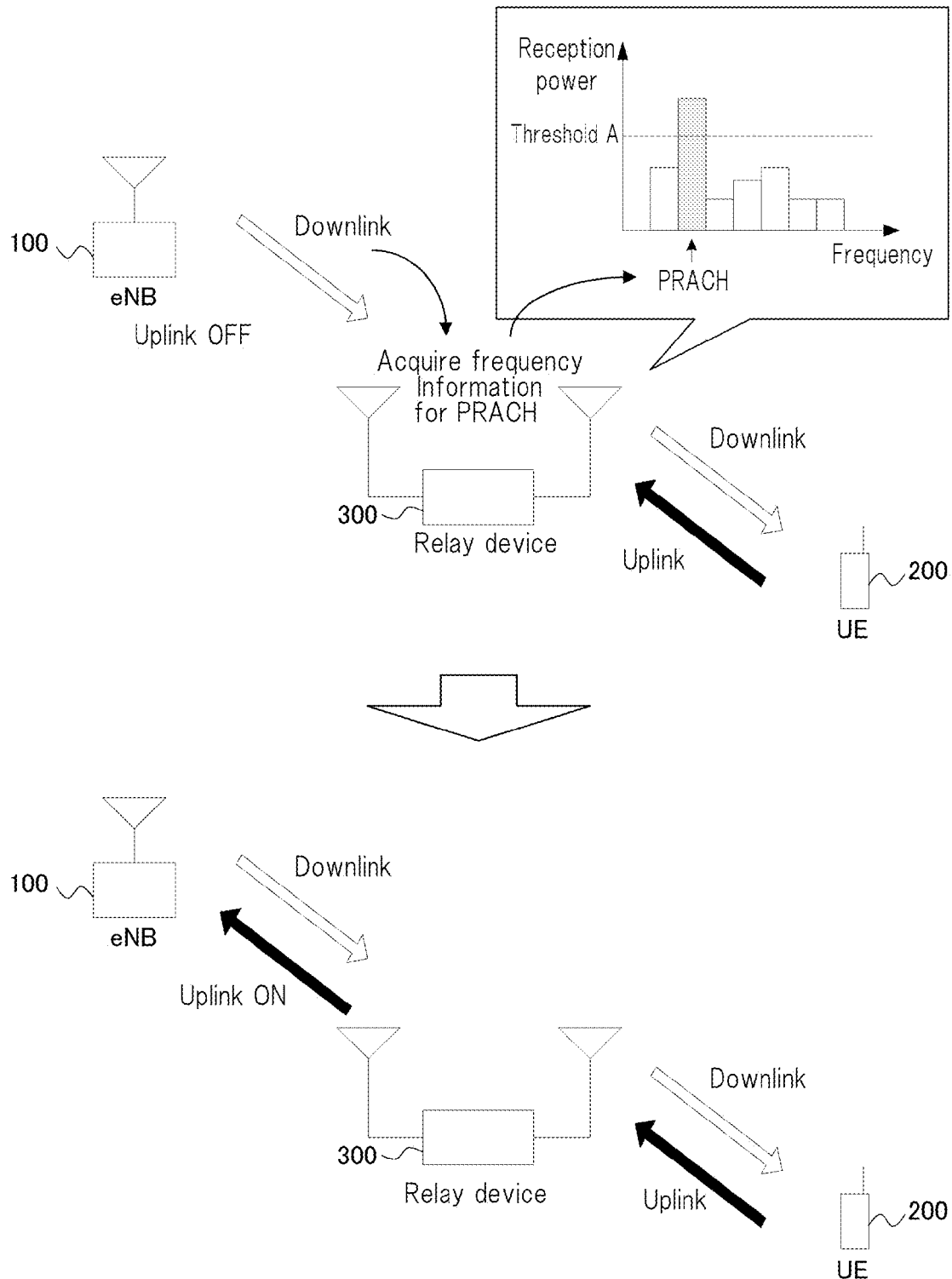
[FIG. 7] is a schematic diagram describing an operation of the radio communication system according to working examples 1 and 2 of the present invention.

If the average reception power exceeds threshold A at step S7 (the result of level determination operation is OK; refer to the lower illustration shown in FIG. 7), relay device 300 starts the uplink signal relaying operation (at step S8; refer to the lower illustration shown in FIG. 7) so as to relay the signal of PRACH that has been just received and other uplink signals (at steps S9, S10, and S11). If it takes a time before relay device 300 starts the uplink signal relaying operation, the signal of PRACH that UE 200 has just transmitted may not be relayed to eNB 100. However, in this case, since UE 200 transmits the signal of PRACH again, no adverse result may occur in the system.

Thereafter, relay device 300 periodically measures the average reception power of the frequency band that PRACH uses and performs the level determination operation for that based on threshold B (B≤A) (at step S12).

Even if the average reception power becomes equal to or lower than threshold B (the result of level determination operation is NG) at step S12, before a predetermined period elapses, if the average reception power exceeds threshold B (at steps S13 and S14), relay device 300 continues the uplink signal relaying operation (at step S15).

Figure 8:
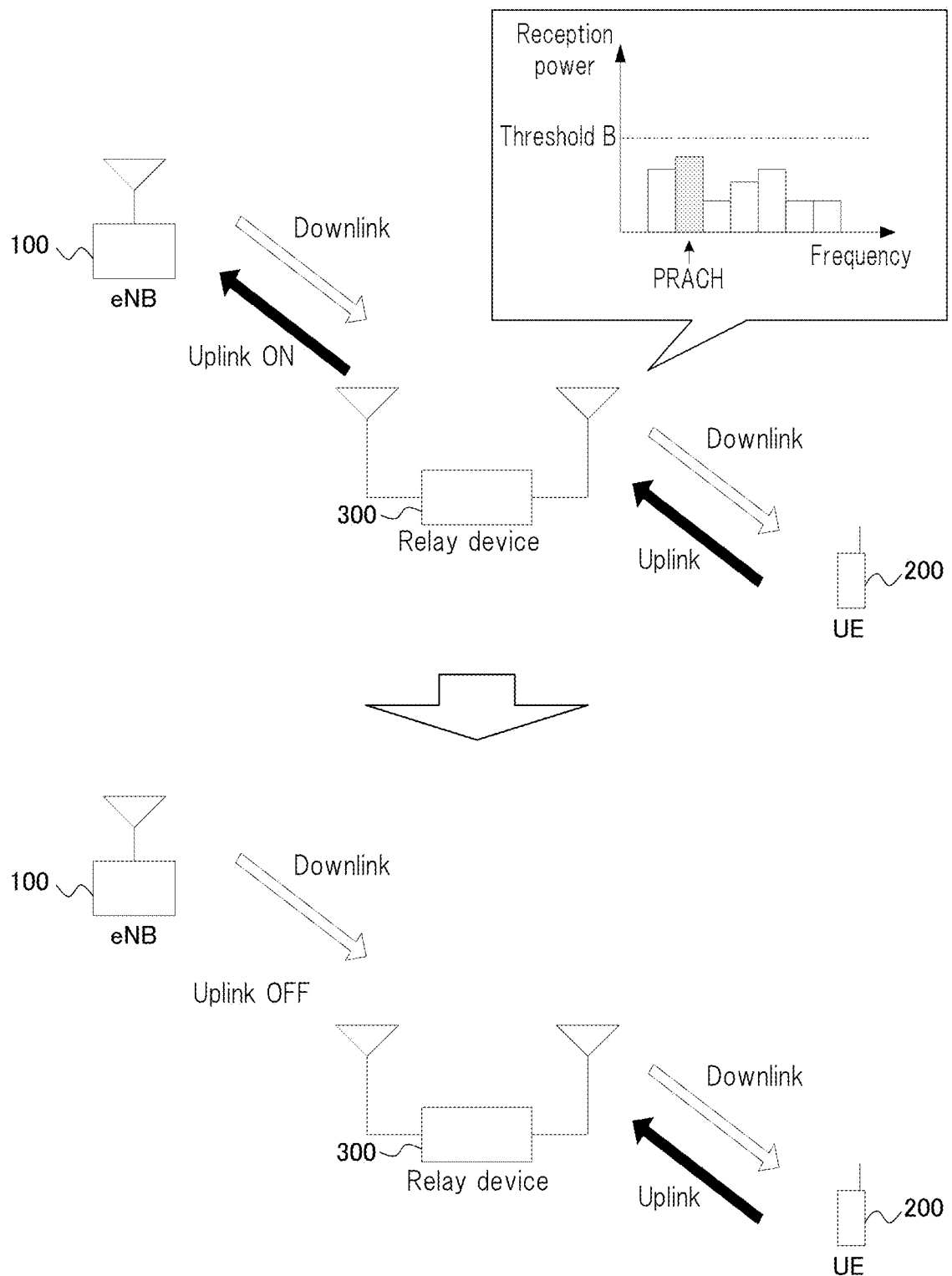
[FIG. 8] is a schematic diagram describing an operation of a radio communication system according to working example 1 of the present invention.

After the average reception power becomes equal to or lower than threshold B (the result of level determination operation is NG at step S12; refer to the upper illustration shown in FIG. 8) and then a predetermined period elapses, if the average reception power does not exceed threshold B (at steps S13 and S14), relay device 300 stops the uplink signal relaying operation (at step S16; refer to the lower illustration shown in FIG. 8). In this case, relay device 300 returns to the process at step S7 (not shown) and then starts the level determination operation for the average reception power based on threshold A again.

The frequency band that PRACH uses may be changed by the communication provider during its operation. Thus, relay device 300 periodically acquires system information and performs the process shown in FIG. 6 based on the acquired system information. As a result, even if the frequency band that PRACH uses is changed, relay device 300 reflects the changed frequency band to the uplink signal relaying operation. Since the period for which relay device 300 acquires system information needs to be as short as possible in consideration of the object of the present invention where relay device 300 follows changed frequency band, it is assumed that the period is around 1 second. However, according to the present invention, since the period is not specified to 1 second, it may be 1 second or shorter.

As described above, according to this working example, relay device 300 periodically acquires frequency information that represents the frequency band of PRACH from system information transmitted from eNB 100 and controls the uplink signal relaying operation based on the uplink signal in the frequency band.

Thus, even if the frequency band of PRACH is changed, since relay device 300 can reflect the changed frequency band to the uplink signal relaying operation, relay device 300 can perform the uplink signal relaying operation corresponding to the changed frequency band.

In addition, according to this working example, since relay device 300 extracts uplink signals of individual frequency bands according to the FFT technique, even if the frequency band of PRACH is changed, relay device 300 can easily follow the changed frequency band. Moreover, according to this working example, the circuit scale of relay device 300 can be reduced compared to the structure that uses a digital filter that performs the extracting process.

Working Example 2

Although the structure of the radio communication system according to working example 2 is the same as the structure of the radio communication system according to working example 1, they differ in their operations.

According to working example 1, after relay device 300 starts the uplink signal relaying operation, relay device 300 performs the level determination operation for the average reception power in the frequency band that PRACH uses. After a predetermined period elapses, if the result of the level determination operation for PRACH is still NG, relay device 300 stops the uplink signal relaying operation.

In contrast, according to this working example, after relay device 300 starts the uplink signal relaying operation, it also performs the level determination operation for the average reception power of a frequency band that a physical channel other than PRACH (for example, PUCCH) uses. After a predetermined period elapses, if the result of the level determination for PRACH and the result of the level determination operation for the physical uplink channel other than PRACH are NG, relay device 300 stops the uplink signal relaying operation.

However, according to this working example, the level determination operation for the physical uplink channel other than PRACH is performed based on threshold C. According to this working example, threshold C may be the same value as threshold A and threshold B or different from threshold A and threshold B.

To accomplish the foregoing operation, level determination unit 308D located in uplink signal detection unit 308 and control unit 309 perform the following operations.

Level determination unit 308D acquires not only frequency information for PRACH, threshold A, and threshold B from level determination unit 308D, but also frequency information for the physical uplink channel other than PRACH and threshold C from control unit 309. The frequency information for the physical uplink channel other than PRACH is contained in the system information, whereas threshold C has been set for control unit 309.

After relay device 300 starts the uplink signal relaying operation, if the average reception power of PRACH becomes equal to or lower than threshold B or thereafter if the average reception power of PRACH exceeds threshold B again or the average reception power of the physical uplink channel other than PRACH exceeds threshold C, level determination unit 308D notifies control unit 309 about that.

After relay device 300 starts the uplink signal relaying operation, if control unit 309 is notified by uplink signal detection unit 308 that the average reception power of PRACH becomes equal to or lower than threshold B, after a predetermined period elapses, if control unit 309 is not notified by uplink signal detection unit 308 that the average reception power of PRACH exceeds threshold B and/or that the average reception power of the physical uplink channel other than PRACH exceeds threshold C, control unit 309 notifies and causes uplink signal relaying unit 304 to turn off the uplink signal relaying operation.

Figure 9:
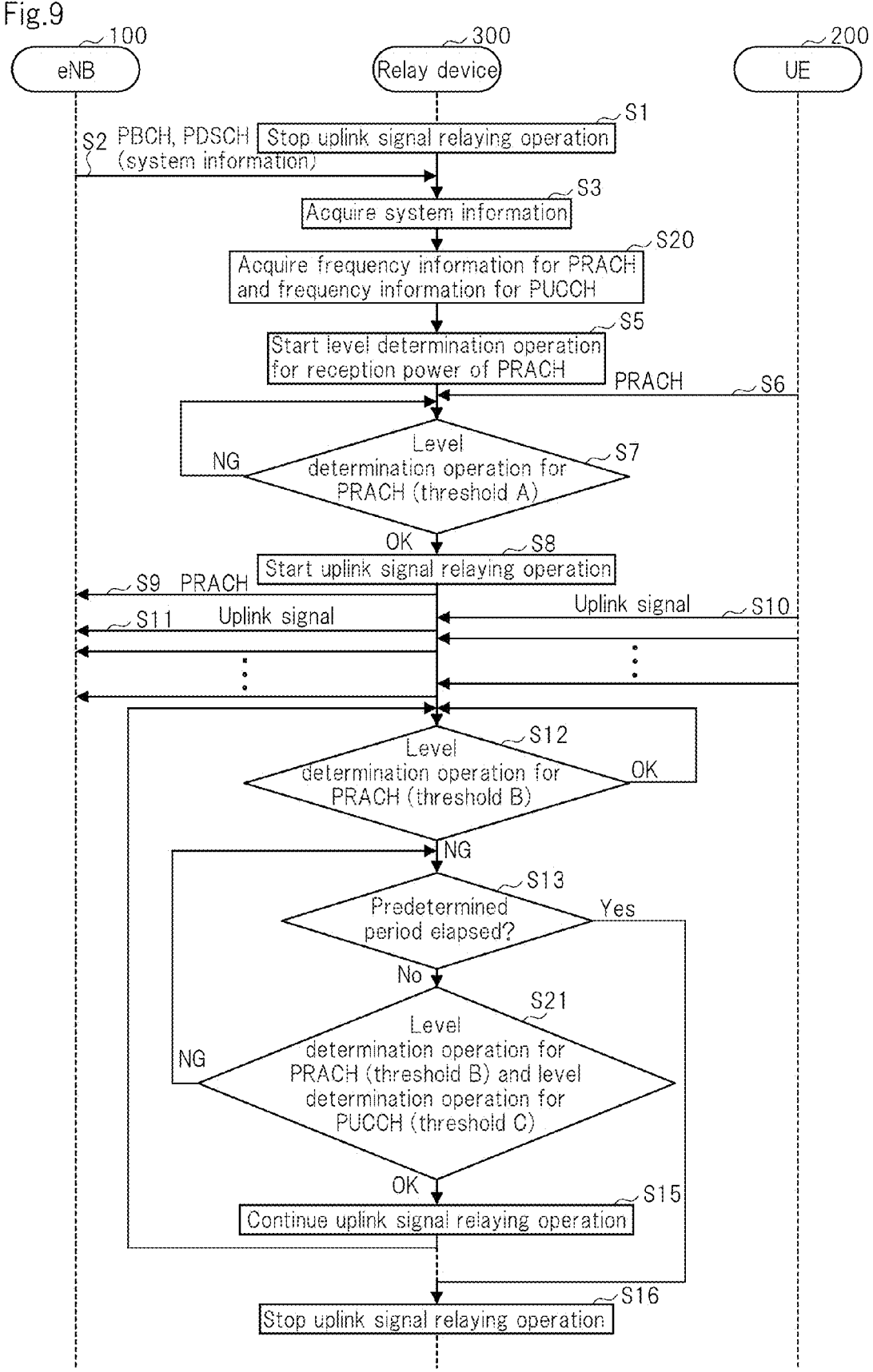
[FIG. 9] is a flow chart describing an operation of a radio communication system according to working example 2 of the present invention.

Next, with reference to FIG. 9 and FIG. 10, the operation of the radio communication system according to this working example will be described. In the following, it is assumed that the physical uplink channel other than PRACH is PUCCH. In FIG. 9, units similar to those shown in FIG. 6 are denoted by similar reference numerals.

Referring to FIG. 9, relay device 300 performs the process from steps S1 to S3 so as to acquire system information like the process shown in FIG. 6.

Thereafter, relay device 300 acquires frequency information for PRACH and PUCCH from the system information (at step S20).

Thereafter, relay device 300 performs the process from step S5 to S12 like the process shown in FIG. 6.

Even if the average reception power of PRACH becomes equal to or lower than threshold B (the result of level determination operation is NG at step s12), before a predetermined period elapses, if the average reception power of PRACH exceeds threshold B or the average reception power of PUCCH exceeds threshold C (at steps S13 and S21), relay device 300 continues the uplink signal relaying operation (at step S15).

Figure 10:
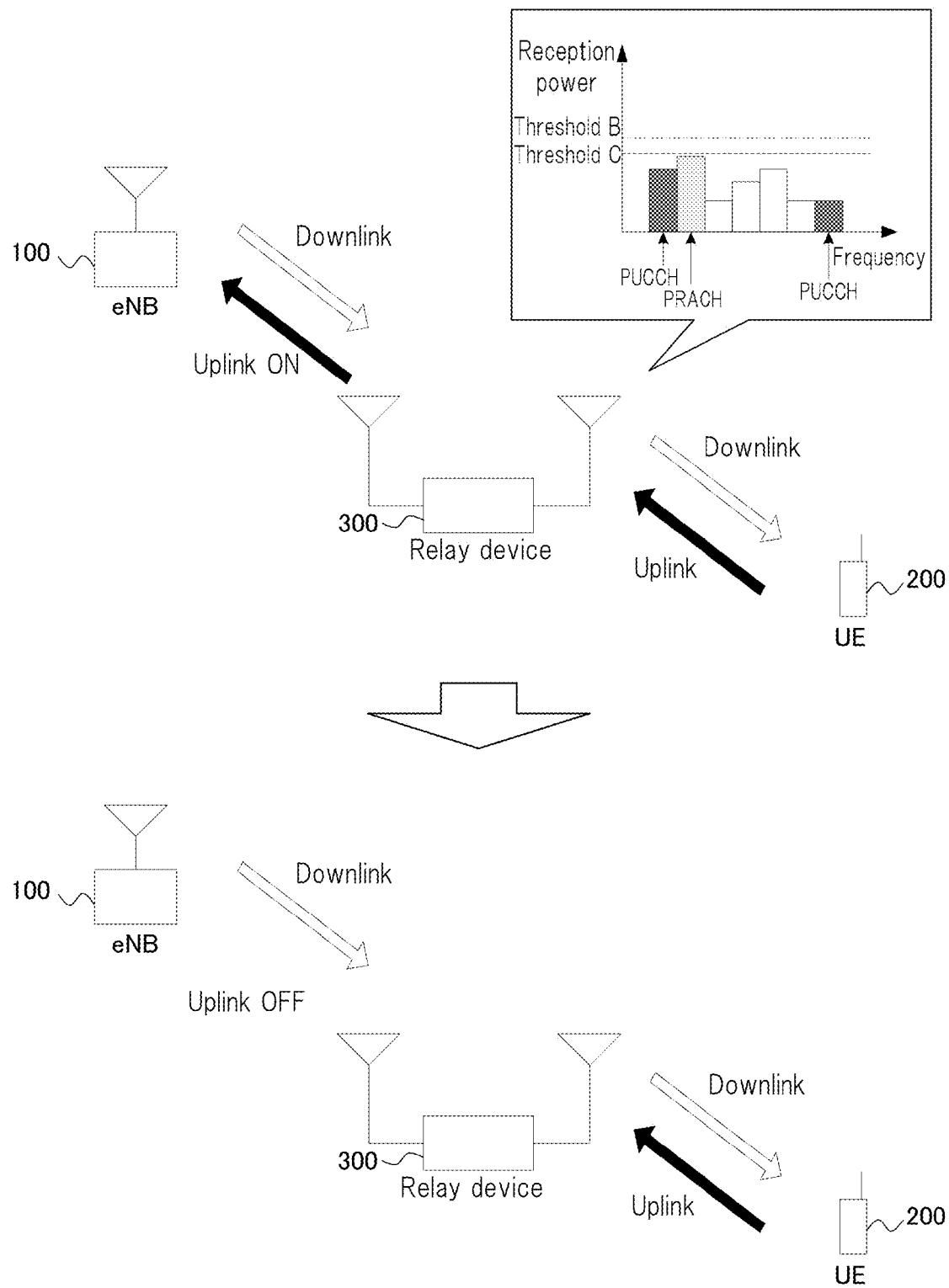
[FIG. 10] is a schematic diagram describing an operation of the radio communication system according to working example 2 of the present invention.

In contrast, after the average reception power of PEACH becomes equal to or lower than threshold B (the result of level determination operation is NG at step S12) and then a predetermined period elapses, if the average reception power of PRACH does not exceed threshold B and the average reception power of PUCCH does not exceed threshold C (at steps S13 and S21; refer to the upper illustration shown in FIG. 10), relay device 300 stops the uplink signal relaying operation (at step S16; refer to the lower illustration shown in FIG. 10).

The process after step S16 is the same as the process shown in FIG. 6.

According to this working example, the physical uplink channel other than PRACH is not limited to the foregoing PUCCH, but limited any physical channel on which a predetermined uplink signal is periodically transmitted (for example, PUSCH).

As described above, relay device 300 according to this working example is different from relay device 300 according to working example 1 only in that the former performs not only the level determination operation for PRACH, but also that for the physical uplink channel other than PRACH and reflects the results to the uplink signal relaying operation. Thus, the effects of the relay device 300 according to working example 2 are the same as those of relay device 300 according to working example 1.

Working Example 3

Figure 11:
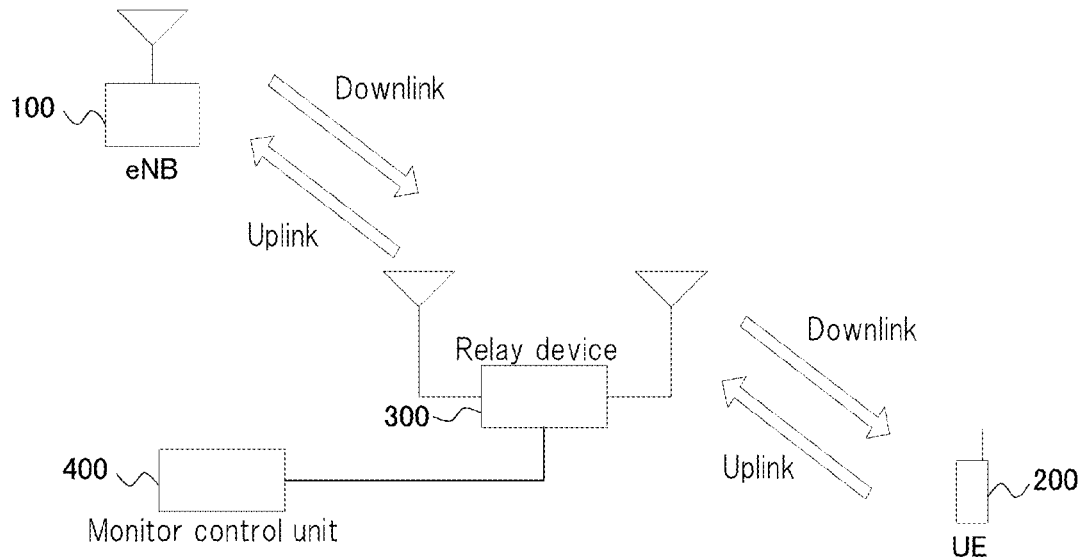
[FIG. 11] is a schematic diagram showing an outlined structure of a radio communication system according to working example 3 of the present invention.

FIG. 11 shows an outlined structure of a radio communication system according to working example 3 of the present invention.

Referring to FIG. 11, the radio communication system according to this working example is different from relay device 300 according to each of working examples 1 and 2 only in that the former is also provided with monitor control unit 400 connected to relay device 300.

Monitor control unit 400 is a computer or a server that notifies relay device 300 of setup information about the relaying operation of relay device 300. The setup information includes frequency information that represents a frequency band that UE 200 uses for an uplink channel. At this point, monitor control unit 400 may notify relay device 300 of the foregoing setup information periodically or at predetermined timings, for example, whenever frequency information is updated. The period during which monitor control unit 400 periodically notifies relay device 300 of the setup information may be the same as the period during which relay device 300 according to working example 1 acquires system information.

Figure 12:
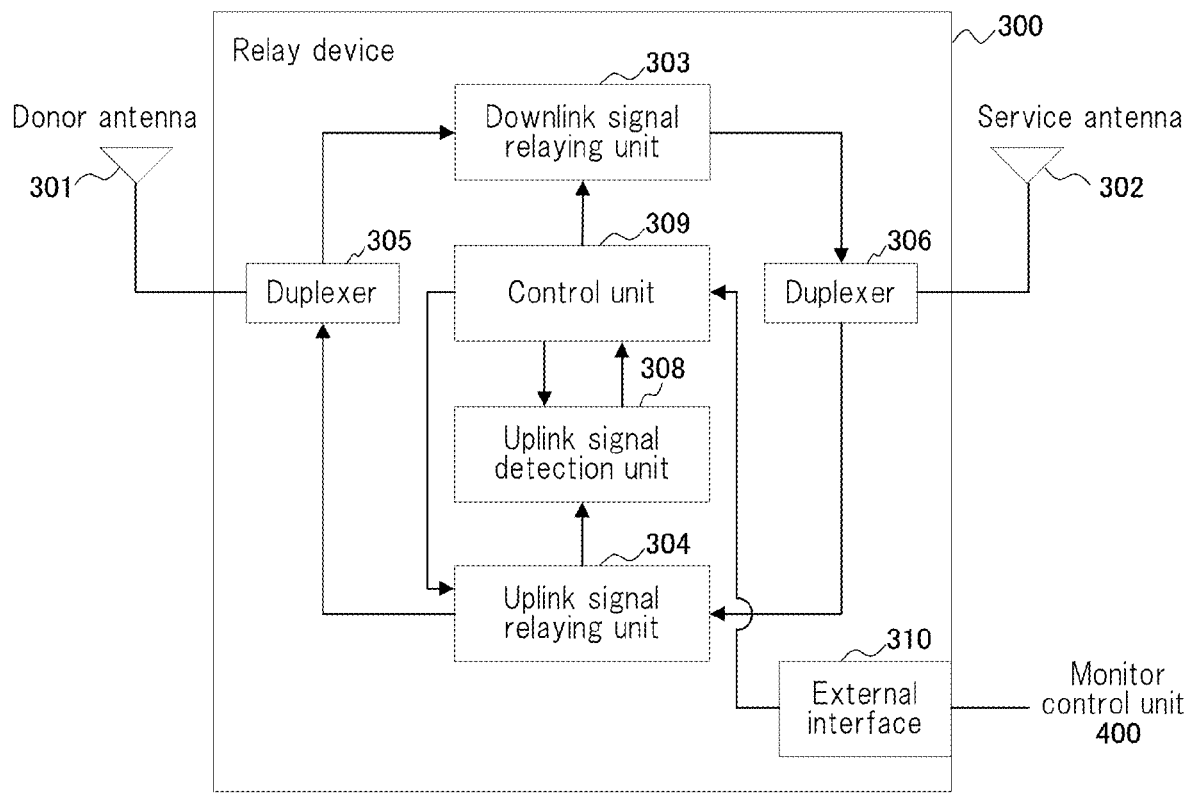
[FIG. 12] is a block diagram showing a structure of a relay device according to working example 3 of the present invention.

FIG. 12 shows a structure of relay device 300 according to this working example.

Referring to FIG. 12, relay device 300 according to this working example is different from relay device 300 according to each of working examples 1 and 2 only in that the former is provided with external interface 310 that is connected to monitor control unit 400 instead of system information acquisition unit 307.

In other words, according to this working example, external interface 310 is an example of frequency information acquisition unit 34 shown in FIG. 2. External interface 310 acquires setup information including the foregoing frequency information from monitor control unit 400 periodically or at predetermined timings as described above.

According to working examples 1 and 2, it was assumed that threshold A, threshold B, and threshold C have been set for control unit 309. In contrast, according to working example 3, threshold A, threshold B, and threshold C may be acquired from monitor control unit 400.

Figure 13:
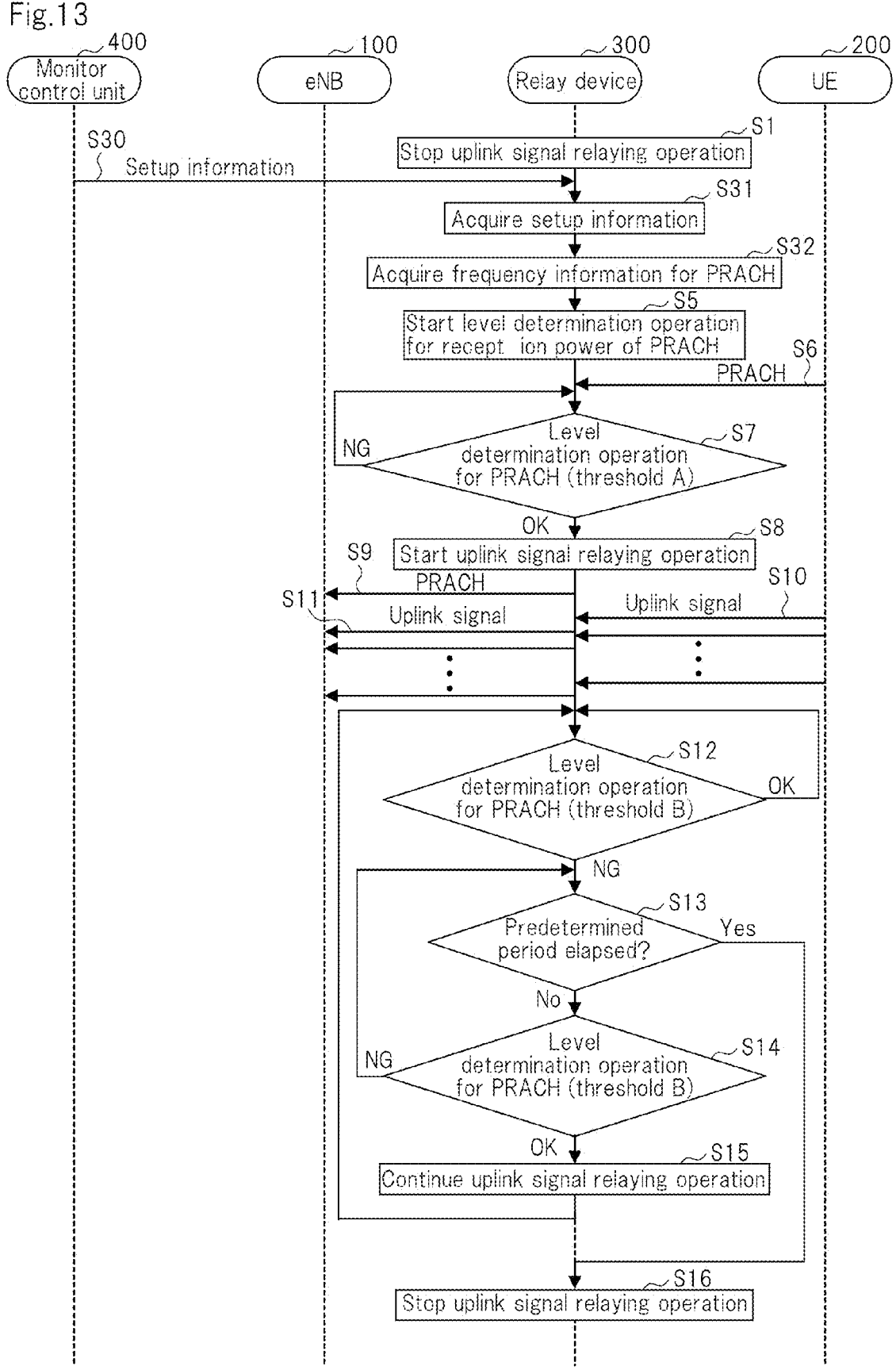
[FIG. 13] is a flow chart describing an operation of the radio communication system according to working example 3 of the present invention.

Next, with reference to FIG. 13 and FIG. 14, the operation of the radio communication system according to this working example will be described. In the following, it is assumed that after relay device 300 starts the uplink signal relaying operation, relay device 300 performs the level determination operation only for PRACH like relay device 300 according to working example 1. In FIG. 13, units similar to those shown in FIG. 6 are denoted by similar reference numerals.

Referring to FIG. 13, while relay device 300 is stopping the uplink signal relaying operation (at step S1), relay device 300 acquires setup information from monitor control unit 400 (at steps S30 and S31) and also frequency information that represents the frequency band that PRACH uses from the setup information (at step S32).

Thereafter, relay device 300 performs the process from steps S5 to S12 like the process shown in FIG. 6.

Even if the average reception power of PRACH becomes equal to or lower than threshold B (the result of level determination operation is NG at step S12), before a predetermined period elapses, if the average reception power of PRACH exceeds threshold B (at steps S13 and S 14), relay device 300 continues the uplink signal relaying operation (at step S15).

Figure 14:
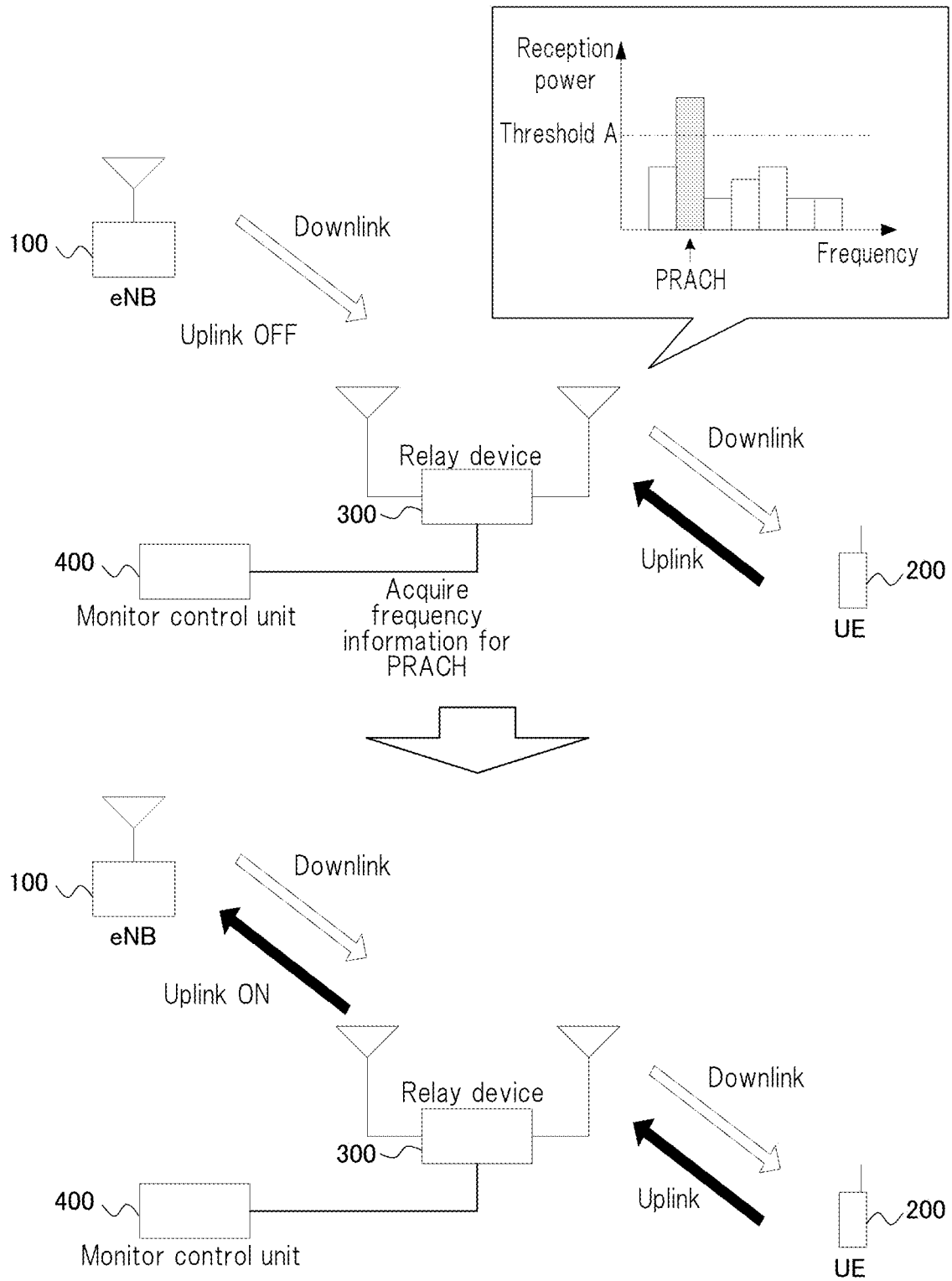
[FIG. 14] is a schematic diagram describing an operation of the radio communication system according to working example 3 of the present invention.

In contrast, after the average reception power of PRACH becomes equal to or lower than threshold B (the result of level determination operation is NG at step S12), after a predetermined period elapses, if the average reception power of PRACH does not exceed threshold B (at steps S13 and S14; refer to the upper illustration shown in FIG. 14), relay device 300 stops the uplink signal relaying operation (at step S16; refer to the lower illustration shown in FIG. 14).

The process after step S16 is the same as the process shown in FIG. 6.

According to this working example, after relay device 300 starts the uplink signal relaying operation, relay device 300 may perform the level determination operation for PUCCH like relay device 300 according to working example 2 (FIG. 9). In this case, steps S2 and S3 shown in FIG. 9 are replaced with steps S30 and S31 shown in FIG. 13 and the frequency information for PRACH and PUCCH are acquired from the setup information.

As described above, relay device 300 according to this working example is different from relay device 300 according to each of working examples 1 and 2 only in that the former acquires frequency information from monitor control unit 400. Thus, the effects of relay device 300 according to this working example are the same as those of relay device 300 according to each of working examples 1 and 2.

With reference to the embodiment and working examples, the present invention has been described. However, it should be understood by those skilled in the art that the structure and details of the present invention may be changed in various manners without departing from the scope of the present invention.

For example, the present invention may be applied to the following cases and environments.
(1) According to working examples 1 to 3, FDD-LTE scheme based mobile phone systems are exemplified. Alternatively, the present invention may be applied to OFDMA or SC-FDMA scheme based mobile phone networks and radio networks.

(2) According to the embodiment and working examples 1 to 3, a relay device and a base station are radio-linked. Alternatively, a relay device and a base station may be linked with a cable (a coaxial cable, an optical cable, a LAN cable, or the like).

However, when a relay device and a base station are linked with a cable, the effects of the present invention can be fulfilled when the following conditions are satisfied:

when a plurality of relay devices are linked to a base station and uplink signals transmitted from the plurality of relay devices are combined by the base station.

when a cable extending from a relay device is connected to a cable that connects a base station and its antenna.

(3) According to the embodiment and working examples 1 to 3, a relay device is provided with one antenna through which a downlink signal is transmitted and one antenna through which an uplink signal is received. Alternatively, the relay device may be provided with two or more antennas through which downlink signals are transmitted and two or more antennas through which uplink signals are received.

Likewise, according to the embodiment and working examples 1 to 3, the relay device is provided with one antenna through which an uplink signal is transmitted and one antenna through which a downlink signal is received. Alternatively, the relay device may be provided with two or more antennas through which uplink signals are transmitted and two or more antennas through which downlink signals are received.

(4) According to the embodiment and working examples 1 to 3, one relay device is provided. Alternatively, the functions of the relay device may be distributed to a plurality of units (hardware units) and they may be configured as "relay system" that radio- or cable-links these units.

(5) According to working examples 1 to 3, a down link signal and an uplink signal relayed by the relay device are digital signals. Alternatively, these signals may be analog signals instead of digital signals.

(6) According to the embodiment and working examples 1 to 3, a relay device controls the uplink signal relaying operation according to the present invention independent from the downlink signal relaying operation. Alternatively, while the relay device is performing the downlink signal relaying operation, it may control the uplink signal relaying operation according to the present invention.

For example, while the relay device is not performing the downlink signal relaying operation, even if the average reception power exceeds a predetermined threshold, the relay device may not perform the uplink signal relaying operation.

Although the downlink signal relaying operation is not specifically controlled, the downlink signal relaying operation may be performed only if the total reception power of all downlink signals exceeds a reference power level. According to working examples 1 and 2, a condition in which the downlink signal relaying operation is performed only if system information has been correctly acquired, may be added.

(7) According to working examples 1 to 3, after a relay device starts the uplink signal relaying operation, if the result of the level determination operation denotes that the average reception power does not exceed a predetermined threshold for a predetermined period, the relay device stops the uplink signal relaying operation. Alternatively, the relay device may decrease the gain of an amplifier that amplifies the uplink signal (lower than the gain of the amplifier acquired when the relay device starts the uplink signal relaying operation) and that continues the uplink signal operation with very low power instead of stopping the downlink signal relaying operation.

(8) According to working examples 1 to 3, when reception power measurement unit 308C measures the average reception power of a base band digital signal of a subcarrier corresponding to the frequency band of PRACH, reception power measurement unit 308C may compute a correlation of the based band digital signal and a known code sequence of PRACH and treat the computed correlation value as the average reception power of the base band digital signal of the corresponding subcarrier. Reception power measurement unit 308C may measure the average reception power for a physical uplink channel other than PRACH in the similar manner.

The method by which the relay device according to the present invention performs may be applied to a program that causes a computer to execute the method. The program can be stored in a storage medium and may also be provided to the outside through a network.

The invention claimed is:

1. A relay device, comprising:
an uplink signal relaying unit that performs an uplink signal relaying operation that amplifies an uplink signal transmitted through an uplink channel from a mobile station and re-transmits the amplified uplink signal to a base station;
a frequency information acquisition unit that acquires frequency information that represents a frequency band that said mobile station uses for the uplink channel periodically or at predetermined timings;
an uplink signal detection unit that determines whether or not the average reception power of the uplink signal in the frequency band represented by the frequency information acquired by said frequency information acquisition unit exceeds a predetermined threshold;
a control unit that controls the uplink signal relaying operation performed by said uplink signal relaying unit based on a determined result of said uplink signal detection unit; and
a downlink signal relaying unit that performs a downlink signal relaying operation that amplifies the downlink signal transmitted through a downlink channel from said base station and re-transmits the amplified downlink signal to said mobile station,
wherein said frequency information acquisition unit periodically acquires system information containing said frequency information from the downlink signal received from said base station,
wherein said frequency information acquisition unit acquires frequency information that represents a first frequency band that said mobile station used for a first channel,
wherein said uplink signal detection unit determines whether or not the average reception power of the uplink signal in said first frequency band exceeds a first threshold, and
wherein said control unit causes said uplink signal relaying unit to start the uplink signal relaying operation if the average reception power of the uplink signal in said first frequency band exceeds said first threshold.

2. The relay device as set forth in claim 1,
wherein said uplink signal detection unit determines whether or not the average reception power of the uplink signal in said first frequency band exceeds a second threshold that is equal to or lower than said first threshold after said uplink signal relaying unit starts the uplink signal relaying operation, and wherein said control unit causes said uplink signal relaying unit to stop the uplink signal relaying operation after said uplink signal relaying unit starts the uplink signal relaying operation and then a predetermined period elapses, if the average reception power of the uplink signal of said first frequency band is equal to or lower than said second threshold.

3. The relay device as set forth in claim 1,
wherein said uplink signal detection unit determines whether or not the average reception power of the uplink signal in said first frequency band exceeds a second threshold that is equal to or lower than said first threshold after said uplink signal relaying unit starts the uplink signal relaying operation, and wherein said control unit causes said uplink signal relaying unit to decrease an amplification gain for the uplink signal and continue the uplink signal relaying operation after said uplink signal relaying unit starts the uplink signal relaying operation and then a predetermined period elapses, if the average reception power of the uplink signal of said first frequency band is equal to or lower than said second threshold.

4. The relay device as set forth in claim 1,
wherein said frequency information acquisition unit further acquires frequency information that represents a second frequency band that said mobile station uses for a second uplink channel, wherein said uplink signal detection unit determines whether or not the average reception power of the uplink signal in said first frequency band exceeds a second threshold that is equal to or lower than said first threshold and whether or not the average reception power of the uplink signal in said second frequency band exceeds a third threshold after said uplink signal relaying unit starts the uplink signal relaying operation, and wherein said control unit causes said uplink signal relaying unit to stop the uplink signal relaying operation after said uplink signal relaying unit starts the uplink signal relaying operation and then a predetermined period elapses, if the average reception power of the uplink signal in said first frequency band is equal to or lower than said second threshold and the average reception power of the uplink signal in said second frequency band is equal to or lower than said third threshold.

5. The relay device as set forth in claim 1,
wherein said frequency information acquisition unit further acquires frequency information that represents a second frequency band that said mobile station uses for a second uplink channel, wherein said uplink signal detection unit determines whether or not the average reception power of the uplink signal in said first frequency band exceeds a second threshold that is equal to or lower than said first threshold and also determines whether or not the average reception power of the uplink signal in said second frequency band exceeds a third threshold after said uplink signal relaying unit starts the uplink signal relaying operation, and wherein said control unit causes said uplink signal relaying unit to decrease an amplification gain for the uplink signal and continue the uplink signal relaying operation after said uplink signal relaying unit starts the uplink signal relaying operation and then a predetermined period elapses, if the average reception power of the uplink signal in said first frequency band is equal to or lower than said second threshold and the average reception power of the uplink signal in said second frequency band is equal to or lower than said third threshold.

6. The relay device as set forth in claim 2,
wherein said first uplink channel is a random access channel that said mobile station initially uses when it originates a call.

7. The relay device as set forth in claim 4,
wherein said first uplink channel is a random access channel that said mobile station initially uses when it originates a call, and wherein said second uplink channel is a physical channel through which said mobile station periodically transmits a predetermined uplink signal.

8. The relay device as set forth in claim 1,
wherein said control unit causes said uplink signal relaying unit to start the uplink signal relaying operation while said downlink signal relaying unit is performing the downlink signal relaying operation and only if the average reception power of the uplink signal in said first frequency band exceeds said first threshold.

9. The relay device as set forth in claim 1,
wherein said uplink signal detection unit includes:
   an orthogonal demodulation unit that transforms the uplink signal received from said mobile station by said uplink signal relaying unit into base band digital signals having I and Q phases according to an orthogonal demodulation technique;
   an FFT unit that transforms the base band signals having I and Q phases according to an FFT technique so as to transform them into base band digital signals corresponding to subcarriers; and
   a reception power measurement unit that measures the average reception power of the base band digital signals corresponding to the subcarriers; and
   a level determination unit that determines whether or not the average reception power of an uplink signal of a subcarrier corresponding to a frequency band represented by said frequency information exceeds a predetermined threshold.

10. The relay device as set forth in claim 9,
wherein said reception power measurement unit measures the average reception power of a base band signal corresponding to a subcarrier corresponding to a frequency band used for an uplink channel in such a manner that said reception power measurement unit computes a correlation of the base band digital signal corresponding to the subcarrier and a known code sequence of the uplink channel and treats the computed correlation value as the average reception power of the base band digital signals corresponding to the subcarrier.

11. A relay system, comprising:
an uplink signal relaying unit that performs an uplink signal relaying operation that amplifies an uplink signal transmitted through an uplink channel from a mobile station and re-transmits the amplified uplink signal to a base station;
a frequency information acquisition unit that acquires frequency information that represents a frequency band that said mobile station uses for the uplink channel periodically or at predetermined timings;
an uplink signal detection unit that determines whether or not the average reception power of the uplink signal in the frequency band represented by the frequency information acquired by said frequency information acquisition unit exceeds a predetermined threshold;

a control unit that controls the uplink signal relaying operation performed by said uplink signal relaying unit based on a determined result of said uplink signal detection unit; and a downlink signal relaying unit that performs a downlink signal relaying operation that amplifies the downlink signal transmitted through a downlink channel from said base station and re-transmits the amplified downlink signal to said mobile station, wherein said frequency information acquisition unit periodically acquires system information containing said frequency information from the downlink signal received from said base station, wherein said frequency information acquisition unit acquires frequency information that represents a first frequency band that said mobile station used for a first channel, wherein said uplink signal detection unit determines whether or not the average reception power of the uplink signal in said first frequency band exceeds a first threshold, and wherein said control unit causes said uplink signal relaying unit to start the uplink signal relaying operation if the average reception power of the uplink signal in said first frequency band exceeds said first threshold.

12. A relay method, comprising:

performing an uplink signal relaying operation that amplifies an uplink signal transmitted through an uplink channel from a mobile station and re-transmits the amplified uplink signal to a base station;

acquiring frequency information that represents a frequency band that said mobile station uses for the uplink channel periodically or at predetermined timings;

determining whether or not the average reception power of the uplink signal in the frequency band represented by said acquired frequency information exceeds a predetermined threshold;

controlling said uplink signal relaying operation based on said determined result; and performing a downlink signal relaying operation that amplifies the downlink signal transmitted through a downlink channel from said base station and re-transmits the amplified downlink signal to said mobile station, wherein said step of acquiring frequency information comprises periodically acquiring system information containing said frequency information from the downlink signal received from said base station, wherein said step of acquiring frequency information comprises acquiring frequency information that represents a first frequency band that said mobile station used for a first channel, wherein said step of determining comprises determining whether or not the average reception power of the uplink signal in said first frequency band exceeds a first threshold, and wherein said step of controlling said uplink signal relaying operation comprises causing to start the step of performing an uplink signal relaying operation if the average reception power of the uplink signal in said first frequency band exceeds said first threshold.

13. A relay device, comprising:

an uplink signal relaying unit that performs an uplink signal relaying operation that amplifies an uplink signal transmitted through an uplink channel from a mobile station and re-transmits the amplified uplink signal to a base station;

a frequency information acquisition unit that acquires frequency information that represents a frequency band that said mobile station uses for the uplink channel periodically or at predetermined timings;

an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit, wherein said frequency information acquisition unit acquires frequency information that represents a first frequency band that said mobile station used for a first channel, wherein said uplink signal detection unit determines whether or not the average reception power of the uplink signal in said first frequency band exceeds a first threshold, wherein said control unit causes said uplink signal relaying unit to start the uplink signal relaying operation if the average reception power of the uplink signal in said first frequency band exceeds said first threshold, wherein said frequency information acquisition unit is connected to a monitor control unit located outside said relay device and acquires control information containing said frequency information, said control information being transmitted from said monitor control unit periodically or at predetermined timings.

14. A relay system, comprising:

an uplink signal relaying unit that performs an uplink signal relaying operation that amplifies an uplink signal transmitted through an uplink channel from a mobile station and re-transmits the amplified uplink signal to a base station;

a frequency information acquisition unit that acquires frequency information that represents a frequency band that said mobile station uses for the uplink channel periodically or at predetermined timings;

an uplink signal detection unit that determines whether or not the average reception power of the uplink signal in the frequency band represented by the frequency information acquired by said frequency information acquisition unit exceeds a predetermined threshold; and a control unit that controls the uplink signal relaying operation performed by said uplink signal relaying unit based on a determined result of said uplink signal detection unit, wherein said frequency information acquisition unit acquires frequency information that represents a first frequency band that said mobile station used for a first channel, wherein said uplink signal detection unit determines whether or not the average reception power of the uplink signal in said first frequency band exceeds a first threshold, wherein said control unit causes said uplink signal relaying unit to start the uplink signal relaying operation if the average reception power of the uplink signal in said first frequency band exceeds said first threshold, wherein said frequency information acquisition unit is connected to a monitor control unit located outside said relay device and acquires control information containing said frequency information, said control information being transmitted from said monitor control unit periodically or at predetermined timings.

15. A relay method, comprising:

performing an uplink signal relaying operation that amplifies an uplink signal transmitted through an uplink channel from a mobile station and re-transmits the amplified uplink signal to a base station;

acquiring frequency information that represents a frequency band that said mobile station uses for the uplink channel periodically or at predetermined timings;

determining whether or not the average reception power of the uplink signal in the frequency band represented by said acquired frequency information exceeds a predetermined threshold; and controlling said uplink signal relaying operation based on said determined result, wherein said step of acquiring frequency information comprises acquiring frequency information that represents a first frequency band that said mobile station used for a first channel, wherein said step of determining comprises determining whether or not the average reception power of the uplink signal in said first frequency band exceeds a first threshold, wherein said step of controlling said uplink signal relaying operation comprises causing to start the step of performing an uplink signal relaying operation if the average reception power of the uplink signal in said first frequency band exceeds said first threshold, and wherein said step of acquiring frequency information comprises connecting to a monitor control unit and acquiring control information containing said frequency information, said control information being transmitted from said monitor control unit periodically or at predetermined timings.

* * * * *